United States Patent
Allen et al.

[15] 3,661,224
[45] May 9, 1972

[54] NOISE MONITORING APPARATUS

[72] Inventors: Richard G. Allen, Pound Ridge, N.Y.;
Benjamin B. Bauer, Stamford; Emil L. Torick, Darien, both of Conn.

[73] Assignee: Columbia Broadcasting System, Inc.

[22] Filed: Sept. 14, 1970

[21] Appl. No.: 71,729

[52] U.S. Cl. ........................ 181/0.5 AP, 340/38 S, 340/221, 340/258 D, 340/261
[51] Int. Cl. ........................................................ G08g 1/10
[58] Field of Search ............... 340/258, 221, 38 R, 38 S, 261; 181/0.5 AP

[56] References Cited

OTHER PUBLICATIONS

Loye; Motor Vehicle Noise Control, Noise Control, Vol. 4, No. 5, July 1959, pp. 30–35

*Primary Examiner*—Rodney D. Bennett
*Assistant Examiner*—Daniel C. Kaufman
*Attorney*—Spencer E. Olson and Martin M. Novack

[57] ABSTRACT

An apparatus for monitoring the noise level of passing vehicles and for automatically photographing a vehicle which emits noise that exceeds a predetermined threshold level. The apparatus includes a vehicle sensor which acoustically determines when a passing vehicle reaches a chosen target area. In a preferred embodiment of the invention the vehicle sensor includes a pair of microphones and an acoustic delay line which feeds one of the microphones. The microphone outputs are correlated to determine when the vehicle enters the target area.

12 Claims, 6 Drawing Figures

INVENTORS.
RICHARD G. ALLEN
BENJAMIN B. BAUER
EMIL L. TORICK

BY M. Novack

ATTORNEY

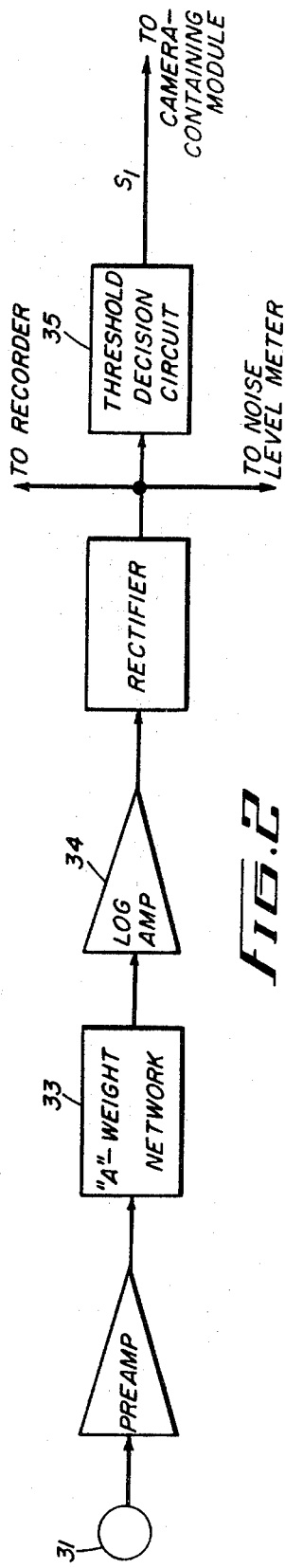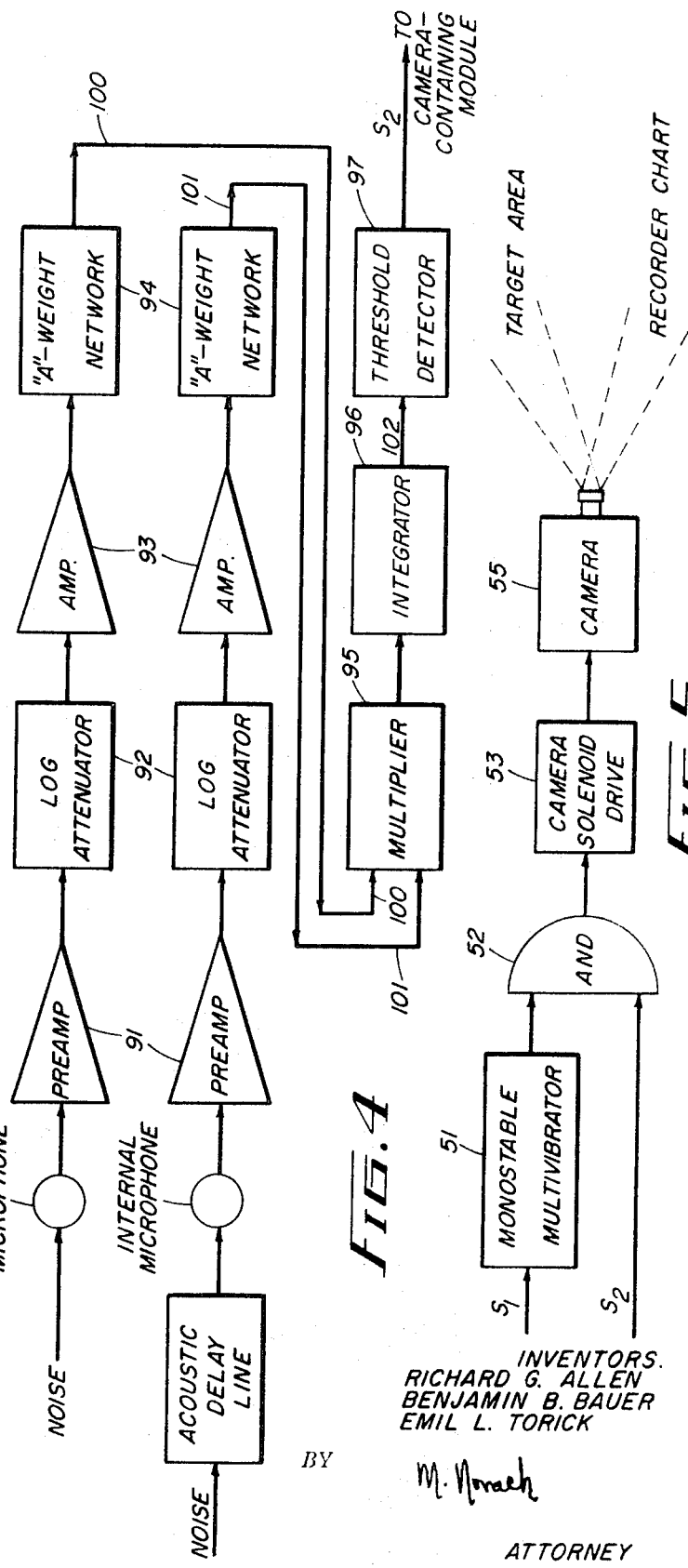

PATENTED MAY 9 1972 3,661,224

INVENTORS.
RICHARD G. ALLEN
BENJAMIN B. BAUER
EMIL L. TORICK
BY
M. Novack
ATTORNEY

NOISE MONITORING APPARATUS

BACKGROUND OF THE INVENTION

This invention relates to a noise monitoring apparatus and, more particularly, to a system which detects and records the noise level of a moving vehicle and also provides a photographic record for identification of such vehicle.

The level of unwanted ambient noise in man's environment has become a matter of increasing concern in recent years. The vehicular contribution to "noise pollution" is significant and increasing traffic levels and the use of bigger and more powerful autos and trucks has led to a statutory regulation in some states with legislation impending in others. The laws typically provide penalties for driving a vehicle which emits noise that exceeds a specified level as measured a certain distance from the vehicle. (The prohibited noise levels are generally specified in terms of "dBA" since an "A"-weighted measurement takes into account the noise response curve of the human ear.)

The effectiveness of vehicular noise legislation depends in large part upon the existence of equipment capable of detecting and recording violations, and up to the present time there has been only limited development of such equipment. It is therefore an object of this invention to provide a reliable automatic system for monitoring noise and facilitating the enforcement of vehicular noise legislation.

SUMMARY OF THE INVENTION

In accordance with the present invention there is provided an apparatus for monitoring the noise level of passing vehicles and for automatically photographing an "offending" vehicle which emits noise that exceeds a predetermined threshold level. A noise level sensor is provided to receive and measure the noise emitted by passing vehicles. The noise level sensor is adapted to generate a first control signal when its measured noise level exceeds a predetermined threshold level. A vehicle sensor is provided to acoustically determine when a passing vehicle reaches a chosen target area and to thereupon generate a second control signal. A camera focused upon the target area is activated to photograph an offending vehicle in response to sequentially receiving the first and second control signals.

In a preferred embodiment of the invention means are provided for continuously recording the noise levels measured by the noise level sensor. The camera is secondarily focused upon the recording means so that the camera takes a split photograph which includes, in addition to a picture of the offending vehicle, an image representative of noise levels recorded during a period of time preceding activation of the camera. In this embodiment the vehicle sensor additionally measures the noise level which it receives when a vehicle reaches the target area. The vehicle sensor generates the second control signal only when its measured noise level exceeds a predetermined threshold level. In this manner the probability of the camera being extraneously activated is substantially eliminated since the noise level received at the noise level sensor and then at the vehicle sensor must both exceed the predetermined threshold before the camera can be activated.

The vehicle sensor of the present invention determines the presence of a moving noise-emitting vehicle in a predetermined target area and can also measure the noise level coming from the target area. The vehicle sensor includes an acoustical delay line having an entrance port oriented toward the target area. A first microphone is coupled to the output end of the delay line. A second microphone is spaced from the entrance port and is located along an extension of the line between the target area and the entrance port. Means are provided for correlating the outputs of the first and second microphones to produce a signal indicative of the presence of a vehicle in the target area.

Further features and advantages of the invention will become more readily apparent from the following detailed description when taken in conjunction with the accompanying drawings.

BRIEF DESCRIPTION OF THE DRAWINGS

FIG. 2 is a block diagram of the noise level sensor module of the invention;

FIG. 4 is a block diagram of the circuitry portion of the vehicle sensor module of the invention;

FIG. 5 is a block diagram of the camera-containing module of the invention;

DESCRIPTION OF THE PREFERRED EMBODIMENTS

Figure 1:
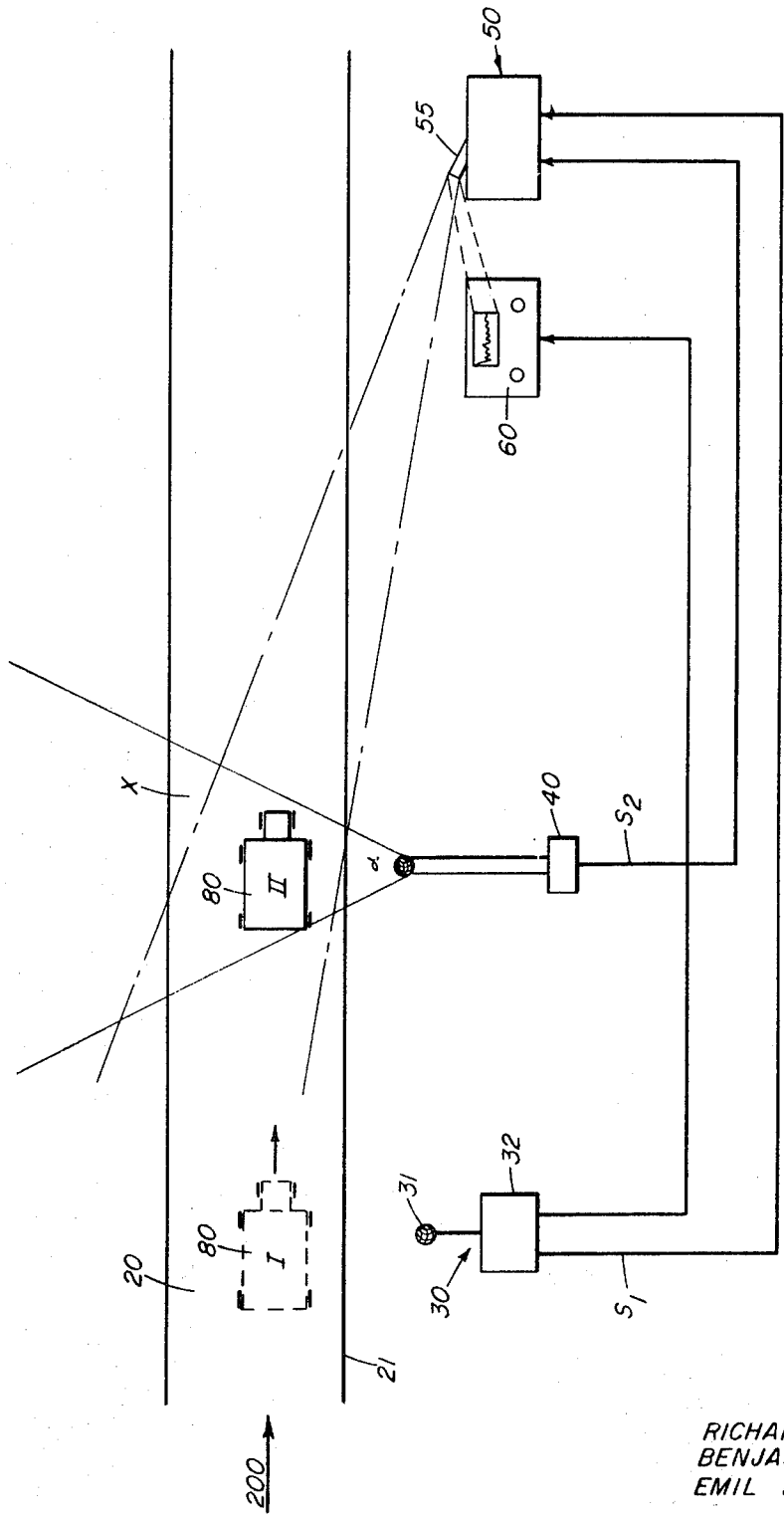
FIG. 1 is a pictorial diagram of an apparatus in accordance with the invention shown as placed adjacent a traffic lane.

Referring now to FIG. 1 there is shown a pictorial diagram of a noise monitoring apparatus shown as generally placed adjacent a traffic lane 20. The apparatus includes a noise level sensor module 30, a vehicle sensor module 40 and a camera-containing module 50. The noise level sensor module 30 includes a microphone 31 which is preferably positioned near the edge 21 of traffic lane 20. Microphone 31 receives the noise emitted by passing vehicles and the noise is amplified and measured by a circuitry portion 32 of module 30. Circuitry 32 includes a threshold circuit which generates a control signal $S_1$ whenever the noise level received by microphone 31 is above a predetermined threshold level. Located further along the edge of the traffic lane is the vehicle sensor module 40. Module 40 is a directionally sensitive acoustic detector which generates a control signal $S_2$ when it receives a noise of at least a minimum predetermined level from a given direction. As illustrated in FIG. 1, the vehicle sensor 40 has a peak sensitivity in the wedged area of angle $\alpha$ with a corresponding traffic lane target area generally indicated by the shaded area X. Located still further along the edge of the traffic lane is the camera-containing module 50 which includes a camera 55 focused generally on the target area X.

The camera is automatically triggered by circuitry in the module 50 in response to the sequential receipt of control signals $S_1$ and $S_2$. In the preferred embodiment of the invention a recorder 60 is provided to record the noise levels measured by the noise level sensor module 30. The camera is secondarily focused upon the recorder chart so as to produce a split-image photograph which will contain an image of the target area in addition to a representation of the noise levels received at microphone 30 during a predetermined period of time preceding activation of the camera.

The basic operation of the apparatus of FIG. 1 can be conveniently described by assuming that an "offending" vehicle such as the truck 80 is traveling along the traffic lane 20 in the direction of arrow 200. An offending vehicle is defined as one which emits a noise level that exceeds some predetermined level, usually as set forth by a state or local law. Before the vehicle 80 approaches the apparatus the noise level microphone 31 has been receiving ambient noise including the noise of non-offending passing vehicles. These received noise levels have been measured by the noise level sensor module 30 and continuously recorded as a function of time on the chart in recorder 60. As the truck 80 approaches the portion of road closest to microphone 31, the noise level received by the microphone will rise and eventually exceed the level required for generation of the control signal $S_1$ which is transmitted by wire to the camera-containing module 50. A timed circuit in module 50 maintains signal $S_1$ active for a period of about 4 seconds. Within about a second later the truck 80 (assumed to be traveling at a conventional speed of about 30–60 m.p.h.) will enter the target area which can be typically located about 50 feet past the area of road closest to microphone 31. The presence of the noise-emitting truck 80 in the target area will cause the vehicle sensor module 40 to generate the control signal $S_2$ which is transmitted by wire to camera-containing module 50. Module 50 includes logic circuitry which activates the camera 51 in response to receiving control signals $S_1$ and $S_2$. The camera, which is typically located about 100 feet further down the road from the target area, then takes a split-image photograph which includes a front view of the truck 80 and the chart of recorder 60. The photographed chart area includes the graphical representation of noise level measurements taken for about a 1-minute period preceding and up to activation of the camera. Thus, the obtained photograph includes the following information: (1) an identifying front view of the offending vehicle including the front license plate (2) a record of the ambient noise as received by microphone 31 for a 1-minute period preceding passage of the vehicle, and (3) a record of the noise level received by microphone 31 just prior to photographing the vehicle (i.e., the noise emitted by the vehicle).

In addition to providing noise monitoring and identification information, the apparatus of the present invention is designed to substantially eliminate extraneous triggering of the camera such as could be caused by non-offending vehicles or by other ambient noise not generated by vehicles in the traffic lane under surveillance. Before the camera can be activated, a noise level above a predetermined threshold must be received at microphone 31 and then, within the next 4 seconds, the vehicle sensor must receive from the direction of the area a noise which also exceeds a predetermined threshold level. It will be appreciated that a single-occurrence noise (such as a backfire) or a noisy vehicle traveling in an opposite-going traffic lane will not activate the camera. Furthermore, a stationary noise source or a low flying aircraft will not satisfy the activation requirements and extraneous activation is therefore seen to be highly unlikely. A more detailed description of the elements of the invented apparatus and of their interaction can be found in the subsequent portions of the specification.

FIG. 2 is a block diagram of the noise level sensor module which includes an omnidirectional microphone 31 that can be mounted on a tripod and positioned about 10 feet from the near edge of a traffic lane. The actual distance from the road or lane in a particular application will typically depend on the manner in which a violation is defined; i.e., for example, the minimum statutory distance at which vehicular noise is to be measured. The output of microphone 31 is preamplified and "A"-weighted by the network 33 which includes RC filters, and then passed through a logarithmic amplifier 34. The output of amplifier 34 is then rectified to produce a dc signal having a magnitude which is linearly related to the received noise level in dBA. This output is utilized to drive the recorder 60 (FIG. 1) and can also be used to drive a noise level meter (not shown) which may be conveniently located in a nearby patrol car. The output of the rectifier is also fed to a threshold decision circuit 35 which generates the control signal $S_1$ whenever the rectifier output corresponds to an input noise level which is above a predetermined threshold level. The circuit 35 includes a differential comparator having one of its inputs fed by a voltage reference which is calibrated to correspond to the desired threshold level. The voltage reference is established using a switchable voltage divider to provide for convenient changing of the threshold level in steps calibrated in dBA.

Figure 3:
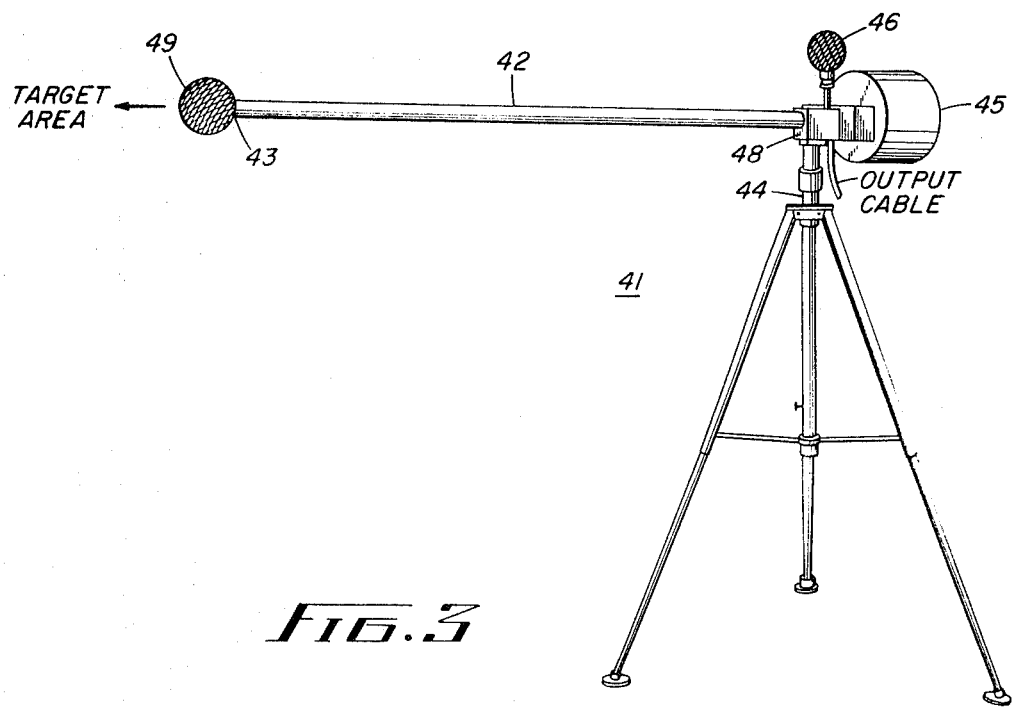
FIG. 3 is a perspective view of a structure which forms a part of the vehicle sensor module of the invention.

FIG. 3 is a perspective view of a structure 41 which, along with associated circuitry, comprises the vehicle sensor module 40. An acoustic delay line 42 has an entrance port 43 which is oriented toward the target area and which is preferably covered with a windscreen 49. The delay line is supported by a housing 48 which is mounted on a tripod 44. At the output end of the delay line 42 is positioned an internal microphone (not shown) which is contained within the housing 48. An acoustical resistance termination 45 is also provided to prevent interfering reflections of the acoustic waves in the delay line. An external omnidirectional microphone is mounted on the housing 48 above the internal microphone and along an extension of the line between the target area and the entrance port 43. The external microphone is preferably covered with a windscreen 46.

A block diagram of the circuitry portion of the vehicle sensing module 40 is shown in FIG. 4. The outputs of the internal and external microphones are each passed through identical circuitry consisting of a preamp 91, a log attenuator 92, an amplifier 93, and an "A"-weighing network 94. This circuitry produces outputs 100 and 101 corresponding to the dBA levels received at the microphones, and these outputs are fed to a multiplier circuit 95 and then to an integrator circuit 96. The multiplier and integrator correlate the outputs 100 and 101 to produce a coherent output 102 only when the signals 100 and 101 are substantially in phase. The output 102 is fed to an adjustable threshold detector 97 which produces the control signal $S_2$ whenever the signal 102 exceeds a predetermined threshold level.

The operation of the vehicle sensor module 40 can be further understood with the aid of FIG. 1 by following the passage of the offending noisy vehicle 80. As the vehicle approaches the target area and is, say, in the position I, the noise signals received at the internal and external microphones will be out of phase. This is because of the difference in distance the sound must travel as between the noise source (i.e., vehicle 80) and these two receiving locations. The total sound path to the entrance port and then through the delay line to the internal microphone is necessarily longer than the direct path to the external microphone. Therefore, the signals 100 and 101 are out of phase and the integrator output 102 is at some relatively low level. As the truck passes into position II in the target area the sound paths to the two microphones become substantially equal and the noise signals received at the microphones are substantially in phase. Accordingly, the output 102 is at a relatively high level. When the vehicle is past the target area the microphone signals will again be out of phase and the output 102 will return to a relatively low level. It is thus seen that the passage of a noisy vehicle through the target area results in an output pulse from the integrator 96. The pulse amplitude corresponds to the noise level emitted by the vehicle, and the threshold detector 97 is adjusted to generate the control signal $S_2$ only when the pulse amplitude exceeds a predetermined threshold level.

In one functioning configuration of the apparatus a 5 foot length of rigid plastic tubing of about 1 in. inner diameter and providing an acoustic delay of 4.6 milliseconds was utilized. The delay line had a substantially flat transmission characteristic up to about 2,000 Hz as is desirable since most vehicular noises are below this frequency. The angle $\alpha$ (FIG. 1), which determines the target area, is an artificial parameter which depends on the arbitrary choice of a minimum defined correlation level.

It will be appreciated that the vehicle sensing function could be achieved in other ways, for example by using a pair of spaced microphones in conjunction with an electrical delay and the disclosed correlation circuitry. Numerous electrical components would be required, however, to achieve an electrical delay of the order of 4.6 milliseconds having a bandwidth of about 2,000 Hz. Also, the acoustic delay line has the advantage of providing inherent delay compensation for the differences in the velocity of sound propagation caused by changes in temperature or atmospheric pressure.

Figure 6:
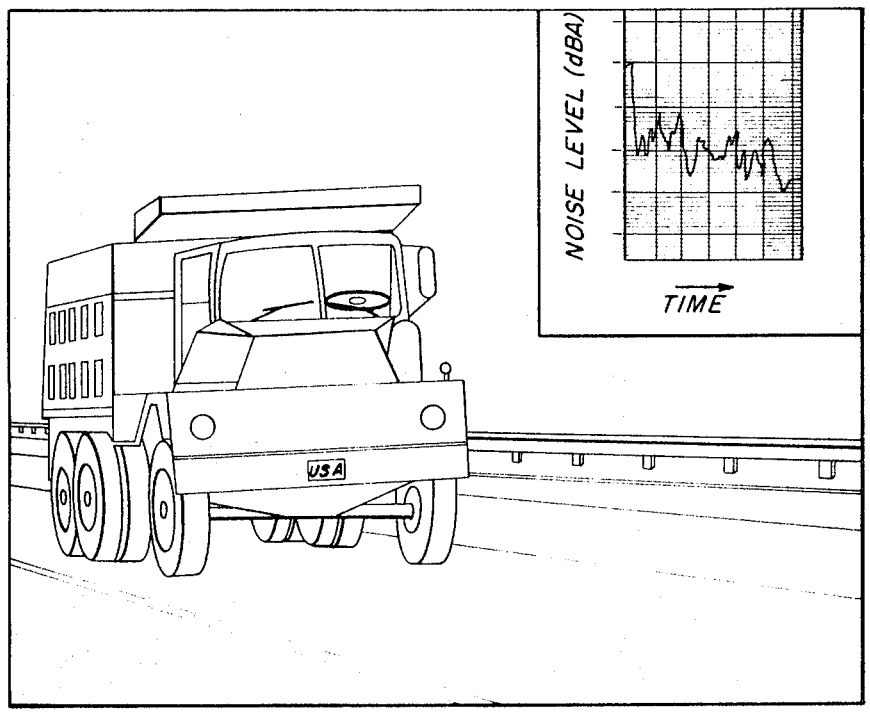
FIG. 6 is a representation of a split-image photograph as taken with the invented apparatus.

FIG. 5 is a block diagram of the camera-containing module 50. The control signal $S_1$ triggers a monostable multivibrator 51 which then remains in its unstable state for 4 seconds during which it supplies an input to AND-gate 52. The multivibrator "on" time is chosen as a function of possible vehicle speeds and of the separation between the microphone 31 and the vehicle sensor. The other input to AND-gate 52 is the control signal $S_2$ which, as was demonstrated above, is generally a pulse. When $S_2$ occurs during the multivibrator "on" time the AND-gate output activates the camera solenoid drive 53 which trips the camera shutter. The camera 55 is preferably of the split-image type being primarily focused upon the target area X and secondarily focused upon the recorder chart. The camera should also preferably be provided with automatic film advance. A representation of a split-image photograph as taken with the invented apparatus is shown in FIG. 6. The front end of the offending vehicle is photographed as it passes the target area. The upper right-hand corner of the photo contains the chart record of the noise level (in dBA) received at the microphone 31 for the 1 minute preceding the passage of the vehicle through the target area. The curve peak near the axis represents the noise level registered by the offending vehicle.

It should be understood that the invention described herein, and especially the electronic circuitry, can be packaged in various manners to suit the convenience of a given manufacturer or user. For example the circuitry beyond the preamplifiers in FIGS. 2 and 4 can be housed together with the camera-containing module and the recorder. This particular housing arrangement was in fact utilized in a functioning model and found to be satisfactory.

What is claimed is:

1. Apparatus for monitoring the noise level of passing vehicles and for automatically photographing a vehicle which emits noise that exceeds a predetermined threshold level comprising:
   a noise level sensor for receiving and measuring noise emitted by passing vehicles, said noise level sensor being operative to generate a first control signal when its measured noise level exceeds a predetermined threshold level;
   a vehicle sensor for acoustically determining when a passing vehicle reaches a chosen target area, said vehicle sensor generating a second control signal when a vehicle reaches said target area; and
   a camera focused upon said target area, said camera being activated to photograph a passing vehicle in response to said first and second control signals.

2. Apparatus as defined by claim 1 further comprising means for continuously recording the noise levels measured by said noise level sensor.

3. Apparatus as defined by claim 2 further comprising means for secondarily focusing said camera upon said recording means so that vehicle photographs taken by the camera include an image representative of noise levels recorded during a period of time preceding activation of the camera.

4. Apparatus as defined by claim 3 wherein said vehicle sensor comprises:
   an acoustical delay line having an entrance port oriented toward said target area;
   a first microphone coupled to the output end of said delay line;
   a second microphone spaced from said entrance port; and
   means for correlating the outputs of said first and second microphones to produce said second control signal.

5. Apparatus as defined by claim 3 wherein said vehicle sensor additionally measures the noise level which it receives when the vehicle reaches the target area and wherein said vehicle sensor generates said second control signal only when its measured noise level exceeds a predetermined threshold level.

6. Apparatus as defined by claim 5 wherein the elements of said apparatus are positioned in spaced relation adjacent a traffic lane, said noise level sensor being positioned closest along the path of an approaching vehicle, said vehicle sensor positioned next closest in the path and said camera positioned furthest in the path.

7. Apparatus as defined by claim 6 wherein said vehicle sensor includes a pair of microphones and means for correlating the electrical signals generated by said microphones.

8. Apparatus as defined by claim 7 wherein said vehicle sensor further includes an acoustic delay line having an entrance port oriented to receive noise from the target area, the output of said delay line being coupled to one of said microphones.

9. Apparatus as defined by claim 8 wherein said noise level sensor includes means for sustaining said first control signal for the period of time required for a moving vehicle to traverse the distance between said noise level sensor and said vehicle sensor.

10. Apparatus for determining the presence of a moving noise-emitting vehicle in a predetermined target area comprising:
    an acoustical delay line having an entrance port oriented toward said target area;
    a first microphone coupled to the output end of said delay line;
    a second microphone spaced from said entrance port; and
    means for correlating the outputs of said first and second microphones to produce a signal indicative of the presence of said vehicle in the target area.

11. Apparatus as defined by claim 10 wherein said second microphone is located along an extension of the line between said target area and said entrance port.

12. Apparatus as defined by claim 11 further comprising a camera focused on said target area and adapted to be activated by said signal.

* * * * *